United States Patent [19]
Okutsu

[11] Patent Number: 5,630,062
[45] Date of Patent: May 13, 1997

[54] IMAGE FORMING APPARATUS, IMAGE FORMING SYSTEM, AND IMAGE FORMING METHOD THEREFOR

[75] Inventor: Toshihisa Okutsu, Yokohama, Japan

[73] Assignee: Canon Kabushiki Kaisha, Tokyo, Japan

[21] Appl. No.: 262,874

[22] Filed: Jun. 21, 1994

[30] Foreign Application Priority Data

Jun. 23, 1993 [JP] Japan .................................. 5-151716

[51] Int. Cl.$^6$ .................................................. G06F 13/00
[52] U.S. Cl. ................ 395/200.03; 395/800; 395/200.11
[58] Field of Search .............................. 395/200.03, 800, 395/700, 725, 500, 200.11, 200.15

[56] References Cited

U.S. PATENT DOCUMENTS 5,237,567  8/1993  Nay et al. .................. 370/85.1
5,287,194  2/1994  Lobiondo .................... 395/114

*Primary Examiner*—Mehmet B. Geckil
*Attorney, Agent, or Firm*—Fitzpatrick, Cella, Harper & Scinto

[57] ABSTRACT

There is disclosed a print system in which one of printers connected to a network is selected in accordance with the attributes of print data without requiring a user to operate a host computer, wherein a printer, which received print data from the host computer via a network cable, checks if the received print data can be printed, and if it is determined that the print data can be printed, the print data is printed; if it is determined that the print data cannot be printed, the print data is transferred to another printer, which can print the print data, via the network cable.

20 Claims, 14 Drawing Sheets

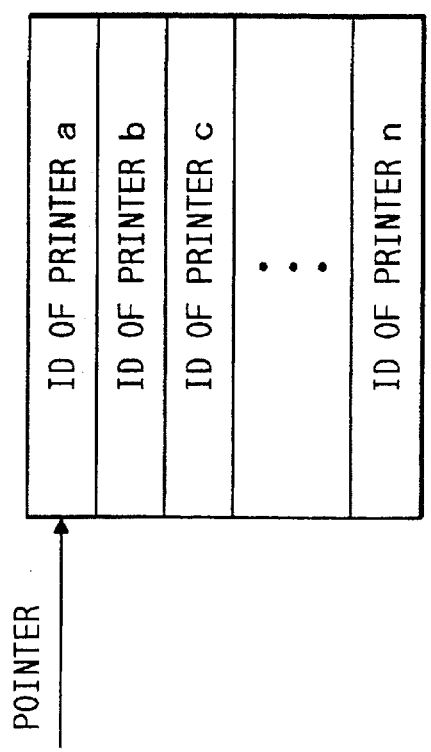

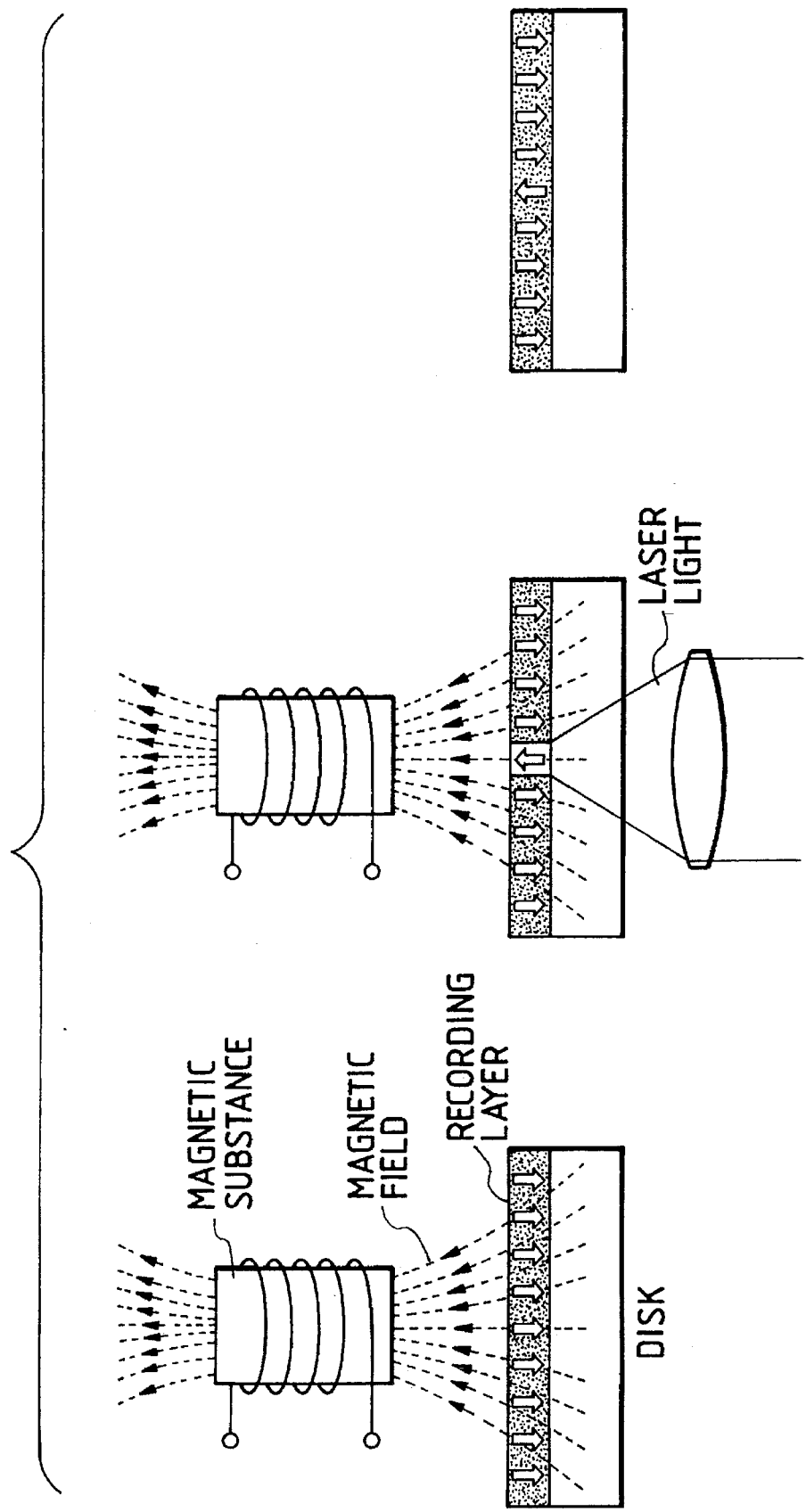

IMAGE FORMING APPARATUS, IMAGE FORMING SYSTEM, AND IMAGE FORMING METHOD THEREFOR

BACKGROUND OF THE INVENTION

1. Field of the Invention

The present invention relates to an image forming apparatus, an image forming system, and an image forming method therefor and, more particularly, to an image forming apparatus, an image forming system, and an image forming method therefor, which select one of a plurality of printers connected to a network in correspondence with, e.g., the attributes of print data.

2. Related Background Art

Conventionally, when a host computer and a plurality of printers are connected via a network, a user of the host computer can arbitrarily select a printer for executing a print operation. More specifically, when the user wants to obtain a color print output, he or she can select a color printer; when the user wants to print out data in a desired recording paper size, he or she can select a printer having recording paper sheets of the desired size.

However, the above-mentioned prior art suffers the following problems. More specifically, the user must select a printer in correspondence with the attributes (e.g., color/monochrome, recording paper size) of print data by operating the host computer by him or herself. In particular, since many kinds of printers are commercially available and can be utilized at present, the load on the user is heavy in selecting a proper printer.

On the other hand, a conventional system for, when a plurality of printers are connected to a network, searching for, from a host computer, a printer which can print image information supplied from the host computer is known. However, with this method, the load on the host computer is heavy, and when a new printer is connected to the network, the new printer cannot often be effectively utilized.

SUMMARY OF THE INVENTION

The present invention has been made in consideration of the above situation, and has as its object to provide an image forming apparatus, an image forming system, and an image forming method therefor, which can reduce the load on a host computer.

It is another object of the present invention to provide an image forming apparatus and an image forming system, which can effectively utilize functions of a color image forming apparatus connected to a network.

In order to achieve these objects, according to one preferred embodiment of the present invention, there is disclosed an image forming apparatus connected to a computer network consisting of a plurality of image forming apparatuses, comprising: reception means for receiving image information via the computer network; first image forming means for forming an image on the basis of the image information; determination (judgment) means for determining whether or not image formation of the image information received by the reception means is possible; and transfer means for, when the determination means determines that the image formation is impossible, searching for a second image forming apparatus, which can perform image formation, via the computer network, and transferring the image information to the second image forming apparatus.

It is still another object of the present invention to provide a system which can freely select an optimal image forming apparatus from those connected to a network.

It is still another object of the present invention to provide an image forming apparatus having a novel function.

The above and other objects and features of the present invention will become apparent from the following description of the embodiments taken in conjunction with the accompanying drawings.

BRIEF DESCRIPTION OF THE DRAWINGS

FIGS. 5A and 5B are views showing an example of commands issued by the printer of the embodiment shown in FIG. 1;

FIG. 6 is a view showing an example of a printer ID table stored in a printer ID table storage unit shown in FIG. 2;

FIG. 17 is a view showing the operation principle of a magnetooptical disk.

DETAILED DESCRIPTION OF THE PREFERRED EMBODIMENTS

An image forming system according to an embodiment of the present invention will be described in detail hereinafter with reference to the accompanying drawings.

Figure 1:
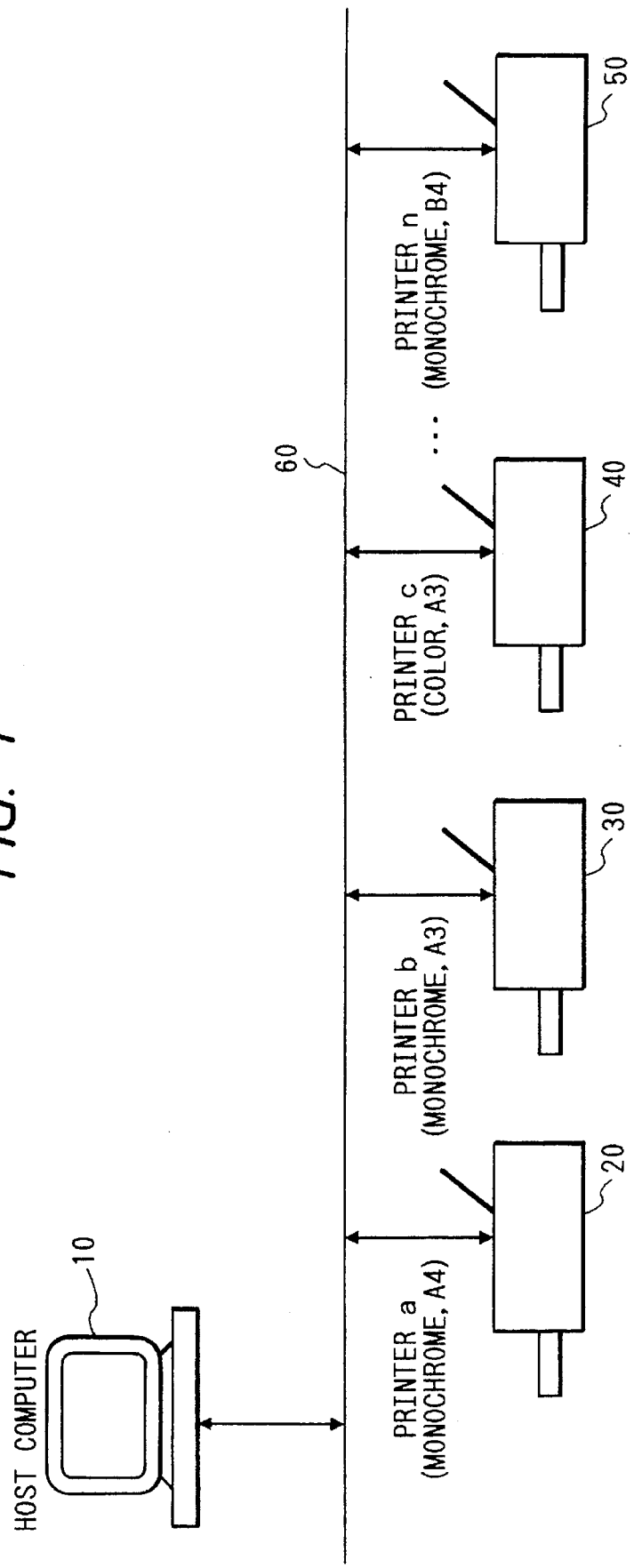
FIG. 1 is a block diagram showing the arrangement of a network comprising an image forming system according to an embodiment of the present invention.

FIG. 1 is a block diagram showing the arrangement of a network comprising an image forming apparatus, an image forming system, and an image forming method therefor according to this embodiment.

Referring to FIG. 1, the network includes a host computer 10 and printers 20, 30, 40, . . . , 50. Of these printers, the printer a 20 is a monochrome printer according to an embodiment of the present invention, which carries A4-sized recording paper sheets, the printer b 30 is a monochrome printer which carries A3-sized recording paper sheets, the printer c 40 is a color printer which carries A3-sized recording paper sheets, ..., the printer n 50 is a monochrome printer which carries B4-sized recording paper sheets. The host computer 10 and the printers a 20 to n 50 (a total of n printers) are connected via a network cable 60.

The host computer 10 comprises an operating system (to be referred to as an "OS" hereinafter) and an application software program (to be referred to as an "AP" hereinafter), supplies print data, a print command, and the like to one of the above-mentioned printers, and causes the printer to develop and print image data.

On the other hand, each printer develops the print data, print command, and the like supplied from the host computer 10 into image data, and forms and outputs a permanent visual image on a recording paper sheet. Note that the printer c 40 has a capability of forming and outputting a color permanent visual image on a recording paper sheet. In the following description, of image data transferred between the host computer 10 and printers, color image data is assumed to have R, G, and B 8-bit data. However, this embodiment is not limited to this.

Figure 2:
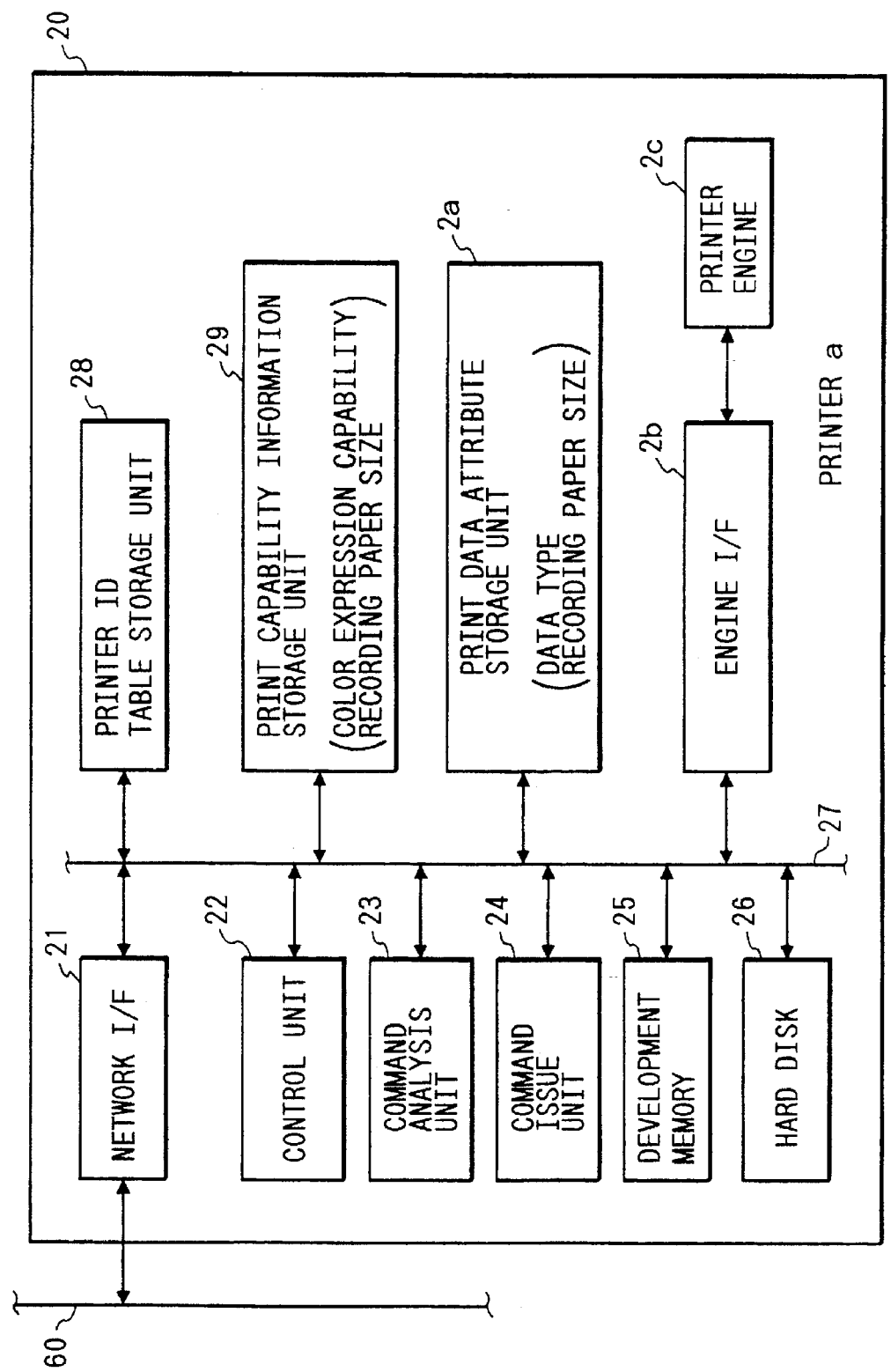
FIG. 2 is a block diagram showing the detailed arrangement of a printer a of the embodiment shown in FIG. 1.

FIG. 2 is a block diagram showing the detailed arrangement of the printer a 20 of this embodiment.

The printer a 20 is constituted by a plurality of microprocessor systems including a ROM and a RAM, and these microprocessor systems, and the like are connected to each other via a data bus 27.

A network interface (to be referred to as a "network I/F" hereinafter) 21 exchanges signals with the host computer 10 and other printers via the network cable 60.

A control unit 22 controls the entire printer a 20. A command analysis unit 23 analyzes print data, a print command, and the like supplied from the host computer 10 or other printers. A command issue unit 24 issues commands and the like to the host computer 10 or other printers.

A development memory 25 is used for developing image data into bit map data. A hard disk 26 stores print data, a print command, and the like supplied from the host computer 10.

A printer ID table storage unit 28 pre-stores a print ID table for identifying devices such as the printers connected to the network cable 60 by, e.g., a network manager.

A print capability information storage unit 29 stores print capability information (e.g., a color expression capability (a monochrome or color printer; the color rendering range in the case of a color printer), the recording paper size, and the like) of the printers. A print data attribute storage unit 2a stores the attributes (e.g., color/monochrome, the recording paper size, and the like) of print data, a print command, and the like supplied from the host computer 10.

Image data developed on the development memory 25 is supplied to a printer engine 2c via an engine interface (to be referred to as an "engine I/F" hereinafter) 2b, and is recorded as a permanent visual image on, e.g., a recording paper sheet.

Figure 3:
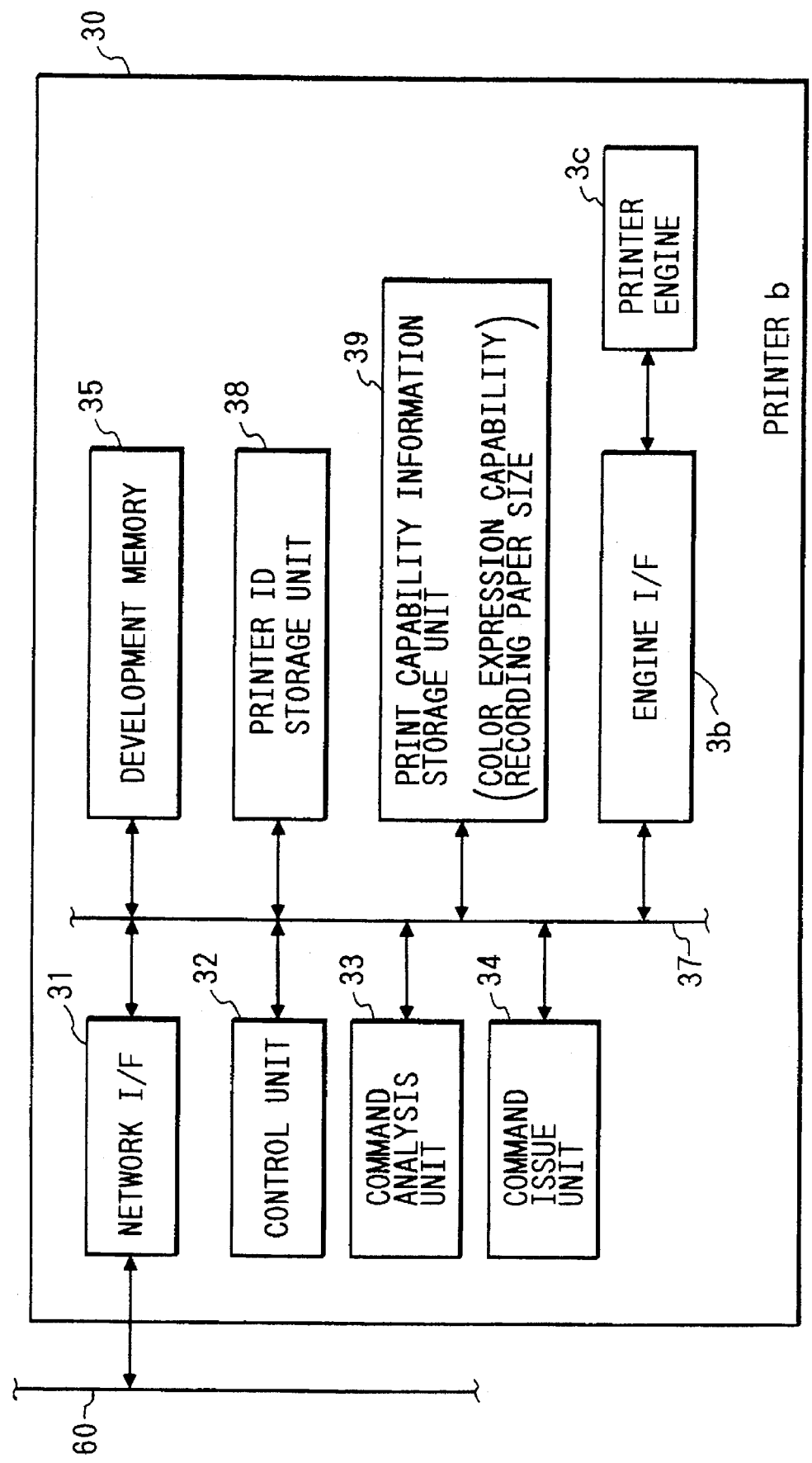
FIG. 3 is a block diagram showing the detailed arrangement of a monochrome printer represented by a printer b of the embodiment shown in FIG. 1.

FIG. 3 is a block diagram showing the detailed arrangement of a monochrome printer represented by the printer b 30 of this embodiment.

The printer b 30 is constituted by a plurality of microprocessor systems including a ROM and a RAM, and these microprocessor systems, and the like are connected to each other via a data bus 37.

A network I/F 31 exchanges signals with the host computer 10 and other printers via the network cable 60.

A control unit 32 controls the entire printer b 30. A command analysis unit 33 analyzes print data, a print command, and the like supplied from the host computer 10 or other printers. A command issue unit 34 issues commands and the like to the host computer 10 or other printers.

A development memory 35 is used for developing image data into bit map data.

A printer ID storage unit 38 pre-stores the ID of the printer b 30, which is used for identifying the device, by, e.g., a network manager.

A print capability information storage unit 39 stores print capability information of the printer. Image data developed on the development memory 35 is supplied to a printer engine 3c via an engine I/F 3b, and is recorded as a permanent visual image on, e.g., a recording paper sheet.

Figure 4:
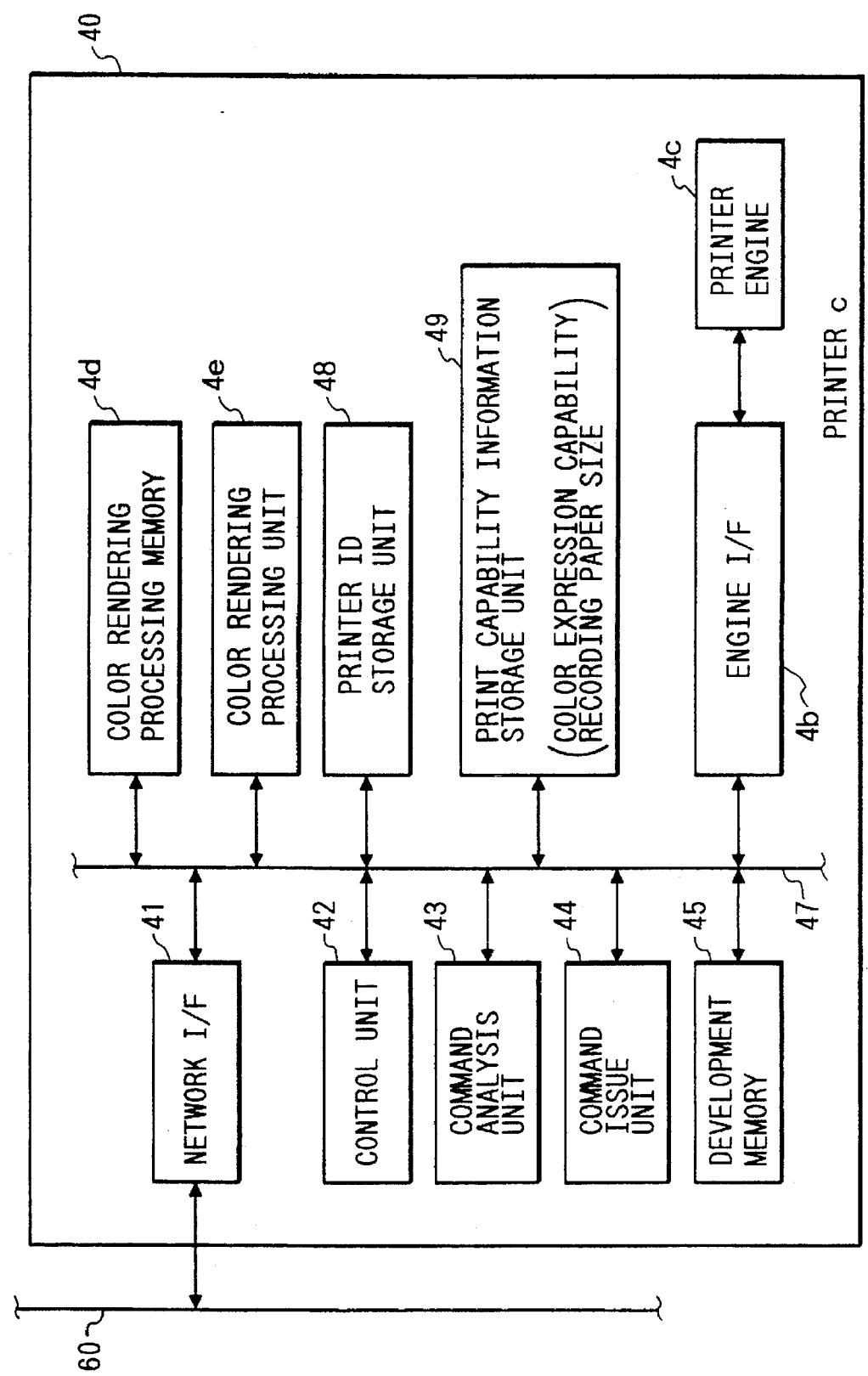
FIG. 4 is a block diagram showing the detailed arrangement of a color printer represented by a printer c of the embodiment shown in FIG. 1.

FIG. 4 is a block diagram showing the detailed arrangement of a color printer represented by the printer c 40 of this embodiment.

The printer c 40 is constituted by a plurality of microprocessor systems including a ROM and a RAM, and these microprocessor systems, and the like are connected to each other via a data bus 47.

A network I/F 41 exchanges signals with the host computer 10 and other printers via the network cable 60.

A control unit 42 controls the entire printer b 40. A command analysis unit 43 analyzes print data, a print command, and the like supplied from the host computer 10 or other printers. A command issue unit 44 issues commands and the like to the host computer 10 or other printers.

A development memory 45 is used for developing color image data formed via color rendering processing into a total of four frames of bit map data, i.e., C (cyan), M (magenta), Y (yellow), and K (black).

A color rendering processing memory 4d stores information (e.g., color masking coefficients for correcting the color characteristics of a printer engine 4c) necessary for color rendering processing. A color rendering processing unit 4e executes color rendering processing (e.g., color masking processing).

A printer ID storage unit 48 pre-stores the ID of the printer c 40, which is used for identifying the device, by, e.g., a network manager.

A print capability information storage unit 49 stores print capability information of the printer. Image data developed on the development memory 45 is supplied to the printer engine 4c via an engine I/F 4b, and is recorded as a color permanent visual image on, e.g., a recording paper sheet.

FIGS. 5A and 5B show an example of commands issued by the printer of this embodiment.

A print capability information requirement command shown in FIG. 5A consists of a command number for identifying a command, a command issued side ID for identifying a command issued side, and a command issuing side ID for identifying a command issuing side. A print capability information return command shown in FIG. 5B consists of a command number for identifying a command, a command issued side ID for identifying a command issued side, a command issuing side ID for identifying a command issuing side, and parameters including a color expression capability and a recording paper size.

FIG. 6 shows an example of the printer ID table stored in the printer ID table storage unit 28 shown in FIG. 2.

In the printer ID table, the ID character strings of all the printers connected to the network are pre-stored by, e.g., a network manager. More specifically, the network manager stores the ID character strings of a total of n printers connected to the network in the printer ID table in a predetermined order. For example, the network manager stores the ID character string of the printer a 20 in the first area of the table, the ID character string of the printer b 30 in the second area, . . . , and the ID character string of the printer n 50 in the n-th area.

Figure 7A:
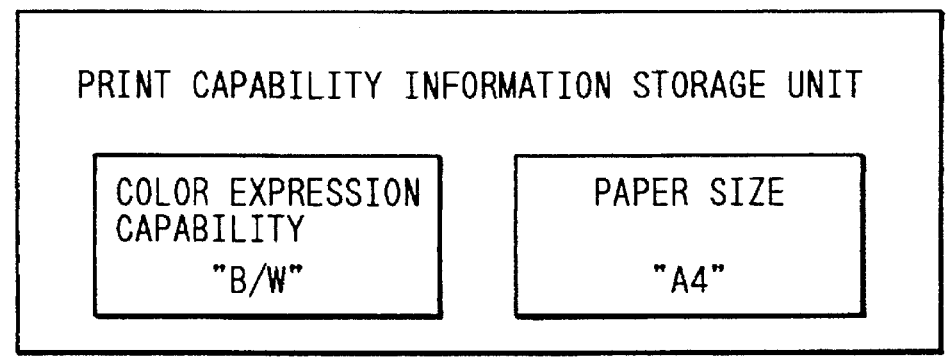
FIGS. 7A and 7B are views showing an example of print capability information stored in print capability information storage units of the printers shown in FIGS. 2 to 4.
Figure 7B:
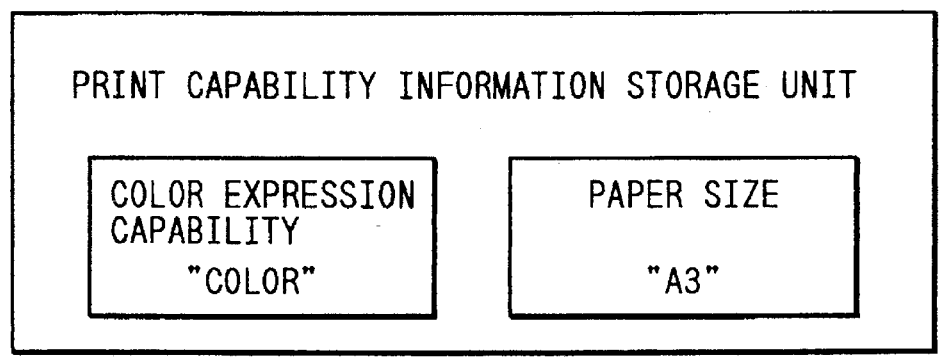

FIGS. 7A and 7B show an example of printer capability information stored in the printer capability information storage units shown in FIGS. 2 to 4.

FIG. 7A shows the contents of the printer capability information storage unit of the printer a 20. In this storage unit, a character string "B/W" indicating monochrome is stored as color expression capability data, and a character string "A4" indicating A4 size is stored as recording paper size data. FIG. 7B shows the contents of the printer capability information storage unit of the printer c 40. In this storage unit, a character string "COLOR" indicating color is stored as color expression capability data, and a character string "A3" indicating A3 size is stored as recording paper size data.

Figure 8:
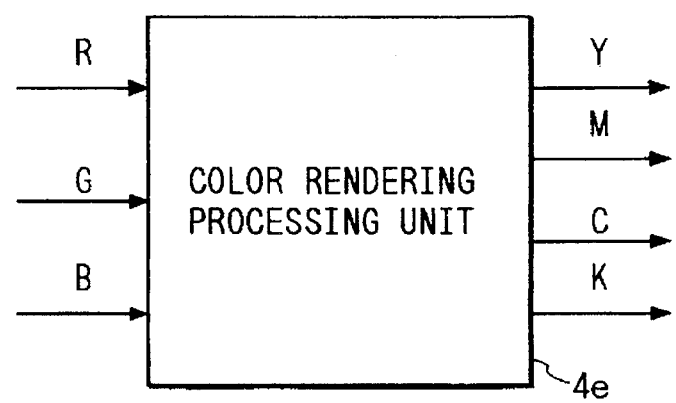
FIG. 8 is a diagram showing an example of processing of a color rendering processing unit of the printer c of the embodiment shown in FIG. 1.

FIG. 8 shows an example of processing in the color rendering processing unit 4e in the printer c 40. For example, input R, G, and B 8-bit luminance data are converted into Y, M, C, and K 8-bit density data via γ correction processing and input masking processing.

Figure 9:
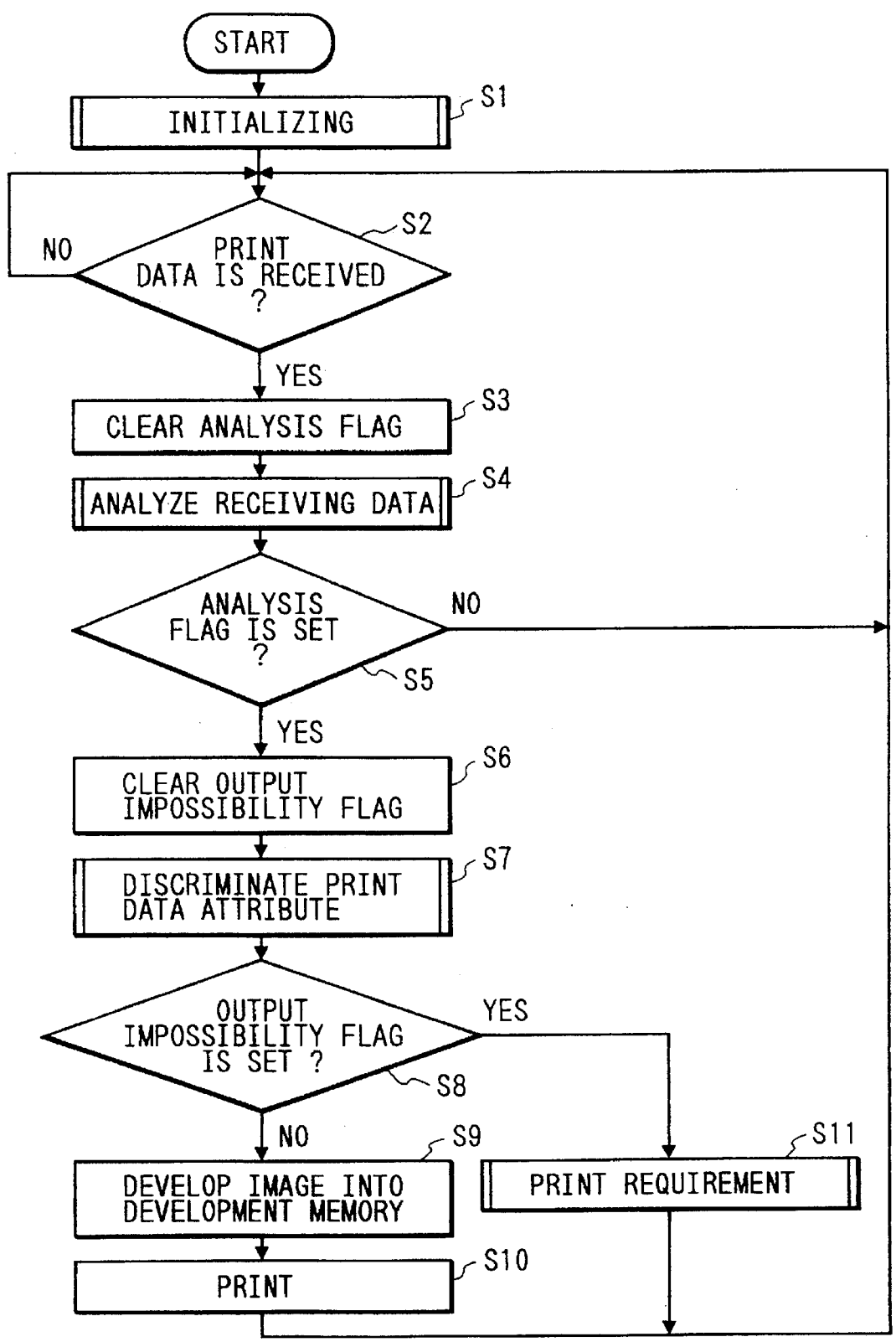
FIG. 9 is a flow chart showing an example of a processing sequence of the embodiment shown in FIG. 1.

FIG. 9 is a flow chart showing an example of a processing sequence of this embodiment, and shows processing to be executed by the printer a 20 which received print data from the host computer. That is, if the received print data can be printed by the printer a 20 itself, the printer a 20 executes a print operation. But if the printer a 20 determines that the 5 received print data cannot be printed by the printer a 20 itself, it searches for a printer which can print the print data from those on the network, and transfers the print data to the searched printer. Note that this processing is executed by the control unit 22 in accordance with a program stored in an internal ROM.

Referring to FIG. 9, when the power supply is turned on, the printer a 20 executes initializing processing (to be described in detail later) in step S1, and waits in step S2 until it receives print data or the like.

Upon reception of print data or the like, the printer a 20 clears its internal analysis flag in step S3, executes receiving data analysis processing (to be described in detail later) in step S4, and checks the status of the analysis flag in step S5. If it is determined in step S5 that the flag is not set, the flow returns to step S2; otherwise, the flow advances to step S6.

When the analysis flag is set, the printer a 20 clears an output impossibility flag in step S6, executes print data attribute discrimination processing (to be described in detail later) in step S7, and checks the status of the output impossibility flag in step S8. If it is determined in step S8 that the flag is set, the flow advances to step S11; otherwise, the flow advances to step S9.

When the output impossibility flag is cleared, the printer a 20 develops monochrome image data into bit map data on the development memory 25 in step S9, and transfers the data developed on the development memory 25 to the printer engine 2c via the engine I/F 2b in step S10 to print the data. Thereafter, the flow returns to step S2.

On the other hand, when the output impossibility flag is set, the printer a 20 executes print requirement processing (to be described in detail later) in step S11, and the flow then returns to step S2.

Figure 10:
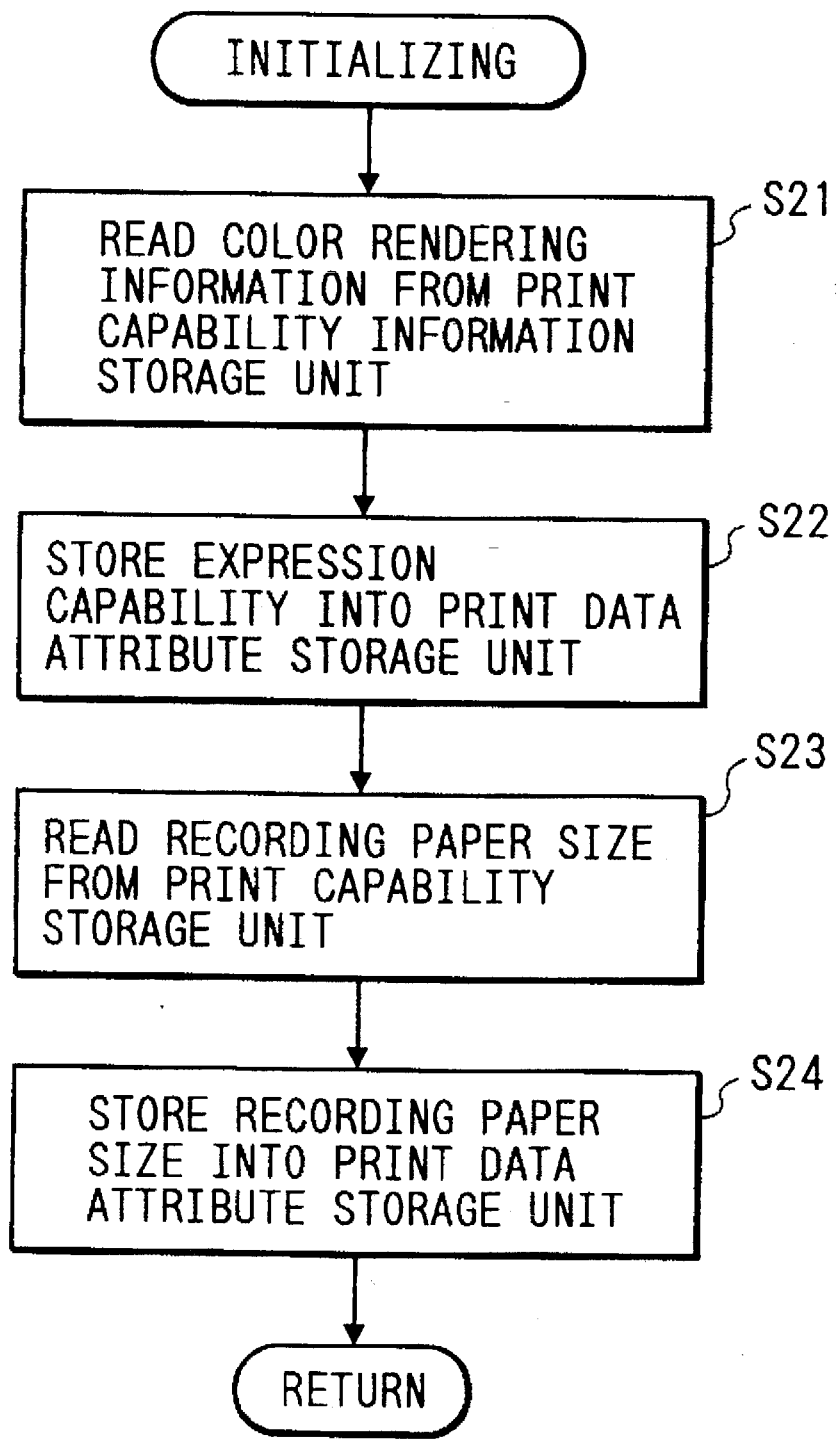
FIG. 10 is a flow chart showing an example of an initialization processing sequence shown in FIG. 9.

FIG. 10 is a flow chart showing an example of the initializing processing sequence.

Referring to FIG. 10, the printer a 20 reads out color expression capability data from the print capability information storage unit 29 in step S21, and stores the color expression capability data in the print data attribute storage unit 2a in step S22. The printer a 20 then reads out recording paper size data from the print capability information storage unit 29 in step S23, and stores the recording paper size data in the print data attribute storage unit 2a in step S24. Thereafter, the flow returns to the parent routine shown in FIG. 9.

Figure 11:
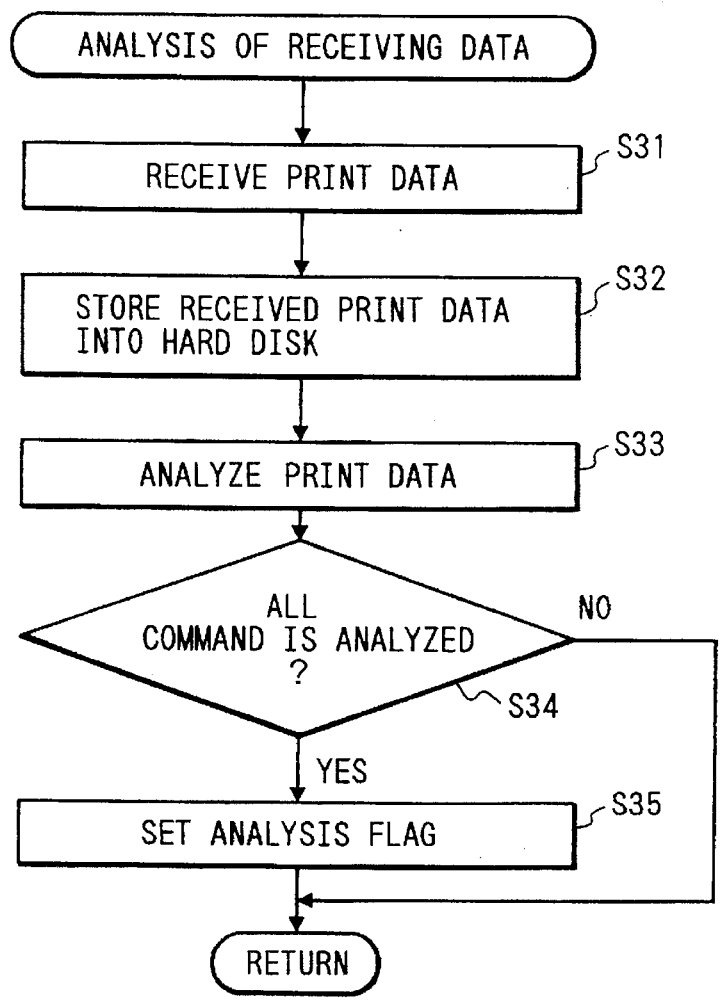
FIG. 11 is a flow chart showing an example of a receiving data analysis processing sequence shown in FIG. 9.

FIG. 11 is a flow chart showing an example of the receiving data analysis processing sequence in step S4 in FIG. 9.

Referring to FIG. 11, the printer a 20 receives print data from the host computer 10 via the network I/F 21 in step S31, and stores the received print data in the hard disk 26 in step S32. The printer a 20 causes the command analysis unit 23 to analyze the received print data in step S33, and checks in step S34 if the print data includes a command which cannot be analyzed. If all commands can be analyzed, the printer a 20 sets the analysis flag in step S35, and thereafter, the flow returns to the parent routine shown in FIG. 9. On the other hand, if the print data includes a command which cannot be analyzed, the flow returns to the parent routine shown in FIG. 9.

Note that the command which cannot be analyzed indicates a non-existing command number or command character string. More specifically, when a command number or command character string for identifying a command does not exist in a print language system processed by the command analysis unit 23, the corresponding command is determined to be a command which cannot be analyzed.

Figure 12:
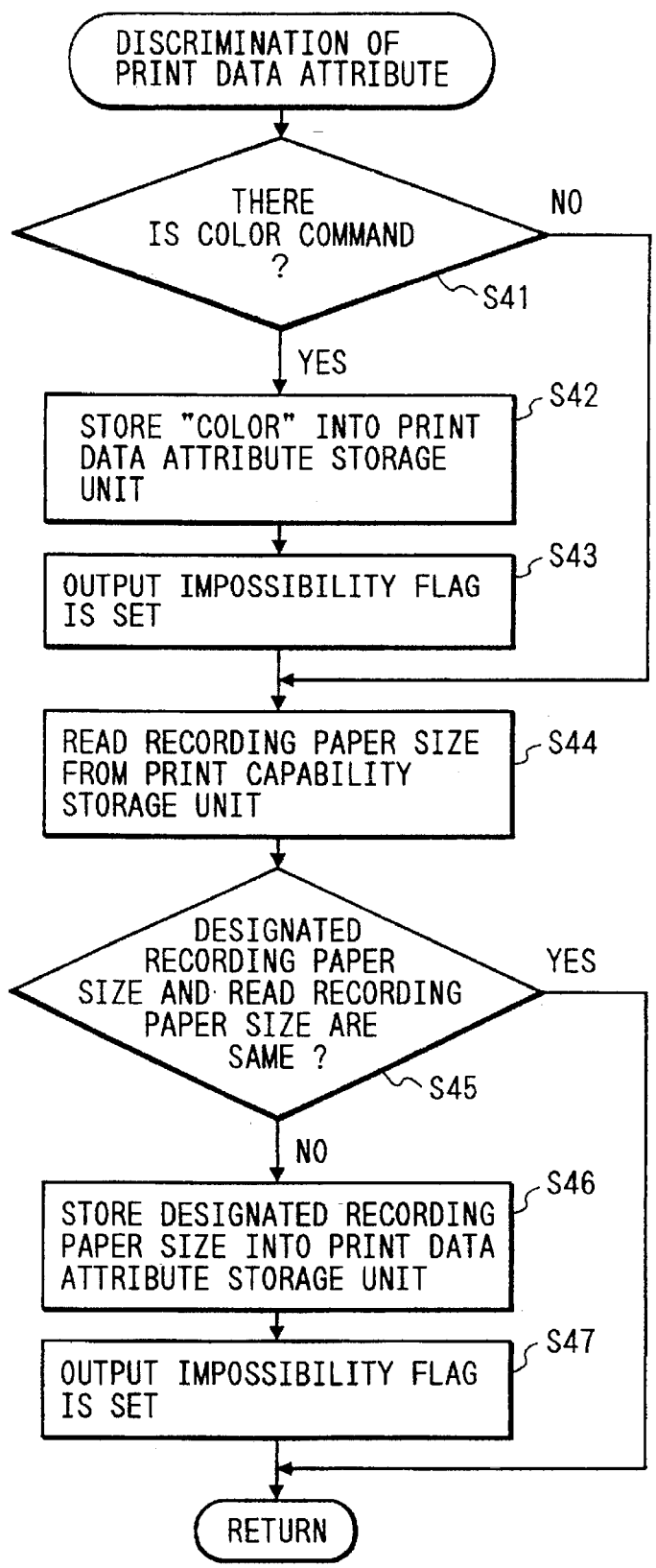
FIG. 12 is a flow chart showing an example of a print data attribute discrimination processing sequence shown in FIG. 9.

FIG. 12 is a flow chart showing an example of the print data attribute discrimination processing sequence.

Referring to FIG. 12, the printer a 20 as a monochrome printer checks in step S41 if the received print data includes a color command. If YES in step S41, the flow advances to step S42; otherwise, the flow jumps to step S44. Note that the color command indicates a command for processing, e.g., R, G, and B luminance format data for designating print colors upon printing of characters or figures.

If the print data includes a color command, the printer a 20 stores a character string "COLOR" indicating the data type in the print data attribute storage unit 2a in step S42, and sets the output impossibility flag in step S43.

Subsequently, the printer a 20 reads out recording paper size data from the print capability information storage unit 29 in step S44, and checks in step S45 if a recording paper size designated in the received print data coincides with the readout recording paper size. If the two sizes coincide with each other, the flow returns to the parent routine shown in FIG. 9; otherwise, the flow advances to step S46.

When the two sizes do not coincide with each other, the printer a 20 stores a character string indicating the designated recording paper size in the print data attribute storage unit 2a as recording paper size data in step S46. For example, if the designated recording paper size is A3 size, a character string "A3" is stored. Subsequently, the printer a 20 sets 5 the output impossibility flag in step S47, and thereafter, the flow returns to the parent routine shown in FIG. 9.

Figure 13:
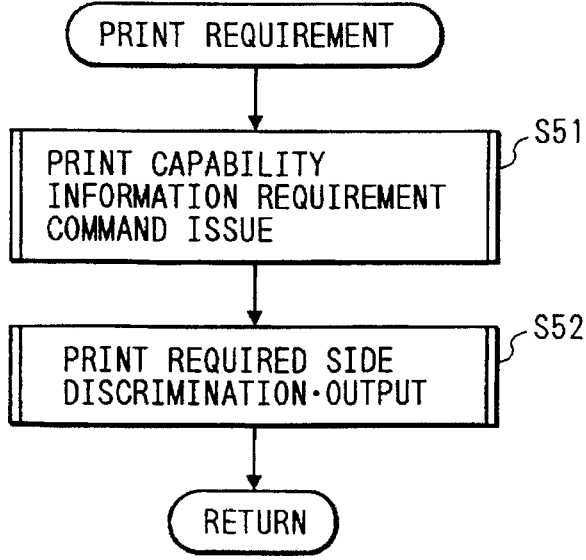
FIG. 13 is a flow chart showing an example of a print requirement processing sequence shown in FIG. 9.

FIG. 13 is a flow chart showing an example of print requirement processing sequence.

Referring to FIG. 13, the printer a 20 issues a print capability information requirement command to other printers connected to the network in step S51 so as to receive, from the printers, print capability information stored in each of the print capability information storage units of the printers. In step S52, the printer a 20 executes print required side discrimination output processing for discriminating a printer which can print the received printer, and outputting the print data to the discriminated printer which can print the data. Thereafter, the flow returns to the parent routine shown in FIG. 9.

Figure 14:
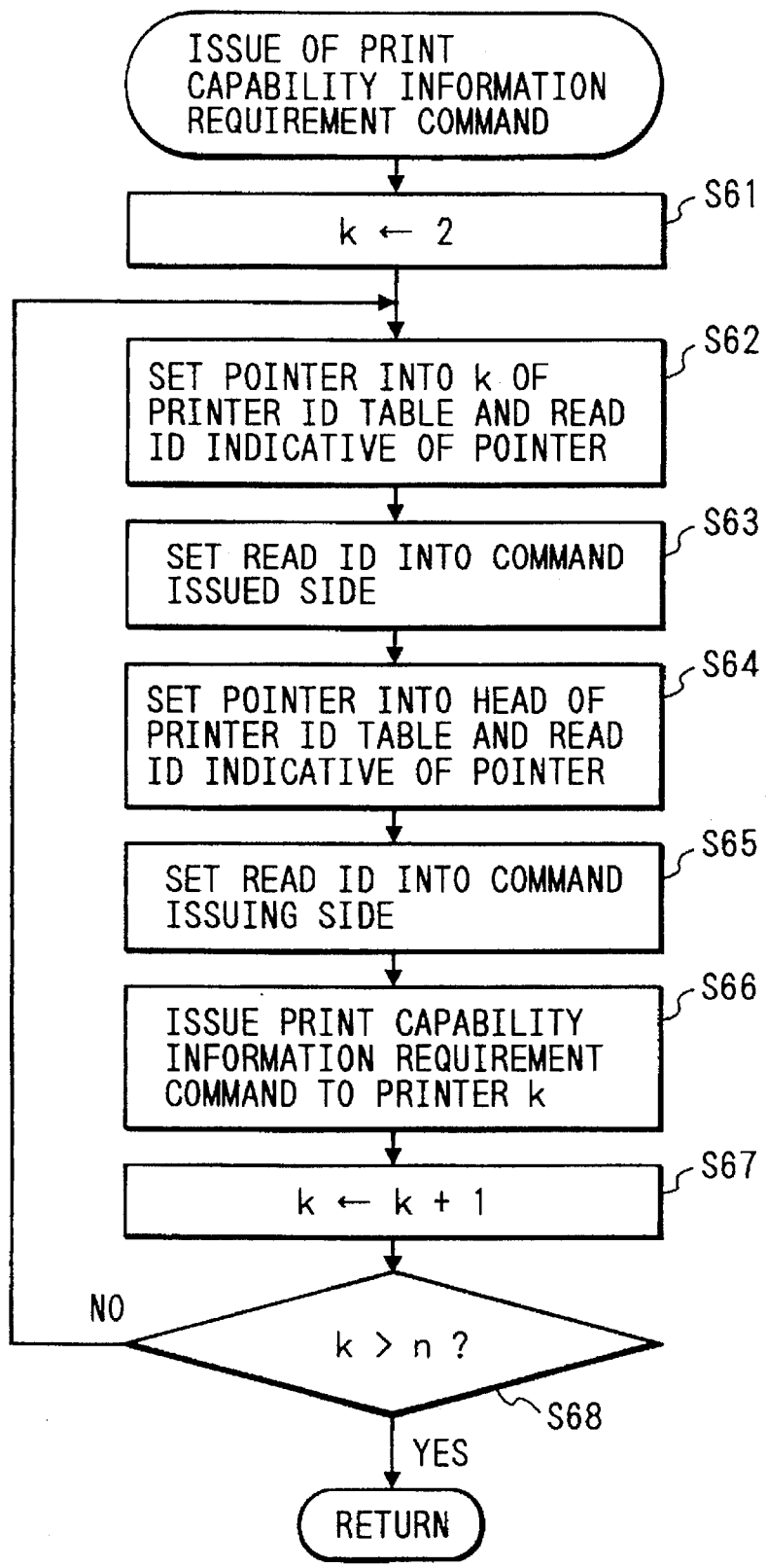
FIG. 14 is a flow chart showing an example of a print capability information requirement command issue processing sequence shown in FIG. 13.

FIG. 14 is a flow chart showing an example of the print capability information requirement command issue processing sequence.

Referring to FIG. 14, the printer a 20 substitutes "2" in a loop counter k in step S61. The printer a 20 sets a pointer at the k-th area in the printer ID table stored in the printer ID table storage unit 28, and reads out an ID character string indicative of the pointer in step S62. The printer a 20 sets the readout ID character string in the command issued side ID of the print capability information requirement command in step S63. Then, the printer a 20 sets the pointer at the head area of the printer ID table and reads out an ID character string indicative of the pointer in step S64. The printer a 20 sets the readout ID character string in the command issuing side ID of the print capability information requirement command in step S65. Thereafter, in step S66, the printer a 20 causes the command issue unit 24 to issue the print capability information requirement command to the printer k.

Subsequently, the printer a 20 increments the contents of the loop counter k in step S67. If it is determined in step S68 that k≦n, the flow returns to step S62; if it is determined in step S68 that k>n, the flow returns to the parent routine shown in FIG. 13.

Figure 15:
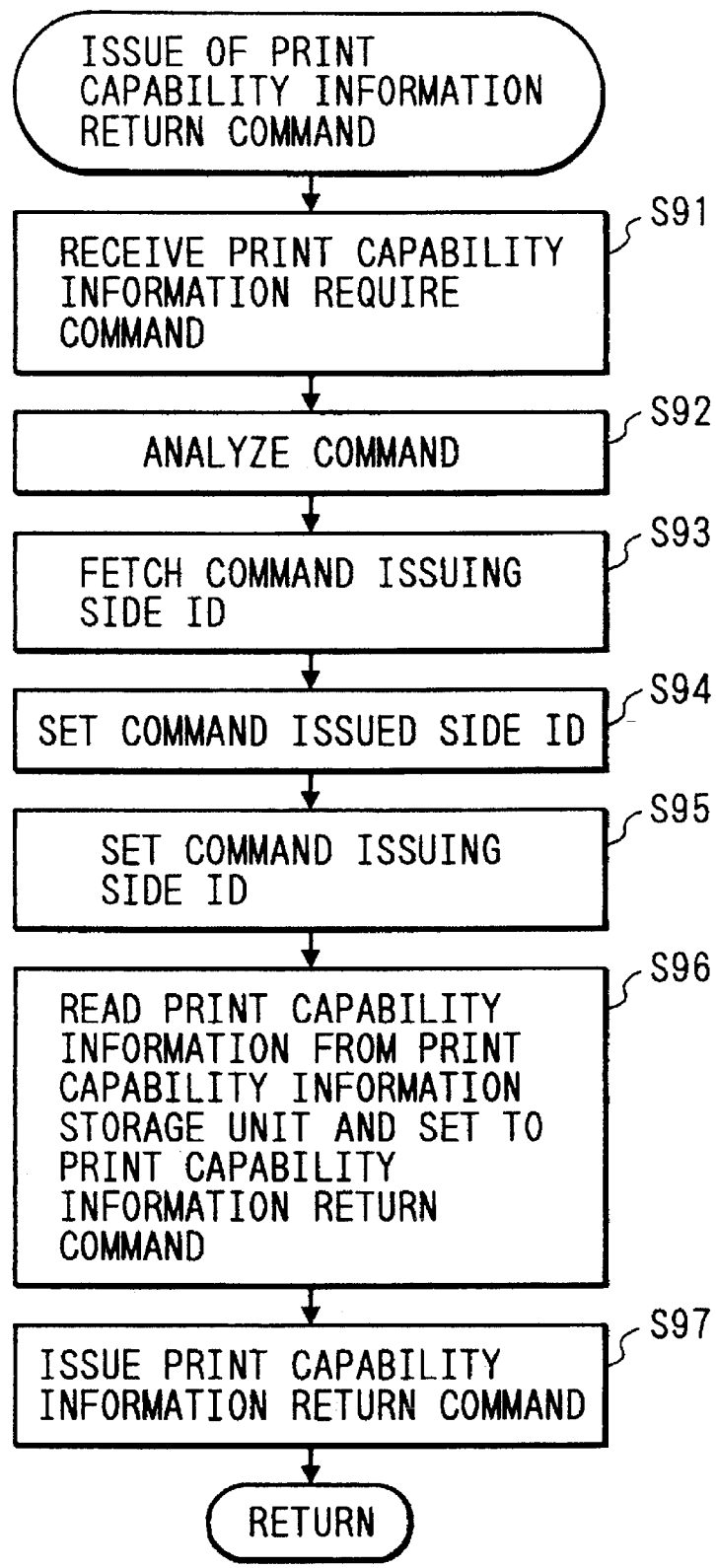
FIG. 15 is a flow chart showing an example of a print capability information return command issue processing sequence of the embodiment shown in FIG. 1.

FIG. 15 is a flow chart showing an example of the print capability information return command issue processing sequence. This processing is executed by each printer other than the printer a 20.

Referring to FIG. 15, each printer receives the print capability information requirement command from the printer a 20 in step S91, analyzes the received command in step S92, reads out the issuing side ID character string from the received command in step S93, and sets the readout ID character string in the command issued side ID of the print capability information return command in step S94. More specifically, the printer a 20, which required the print capability information, is designated as the command issued side.

Subsequently, the printer sets the ID character string read out from the printer ID storage unit in the command issuing side ID of the print capability information return command in step S95, and sets color expression capability data, recording paper size data, and the like read out from the print capability information storage unit in parameters of the print capability information return command in step S96. Then, the printer issues the printer capability information return command to the printer a 20 in step S97, and thereafter, ends processing.

Figure 16:
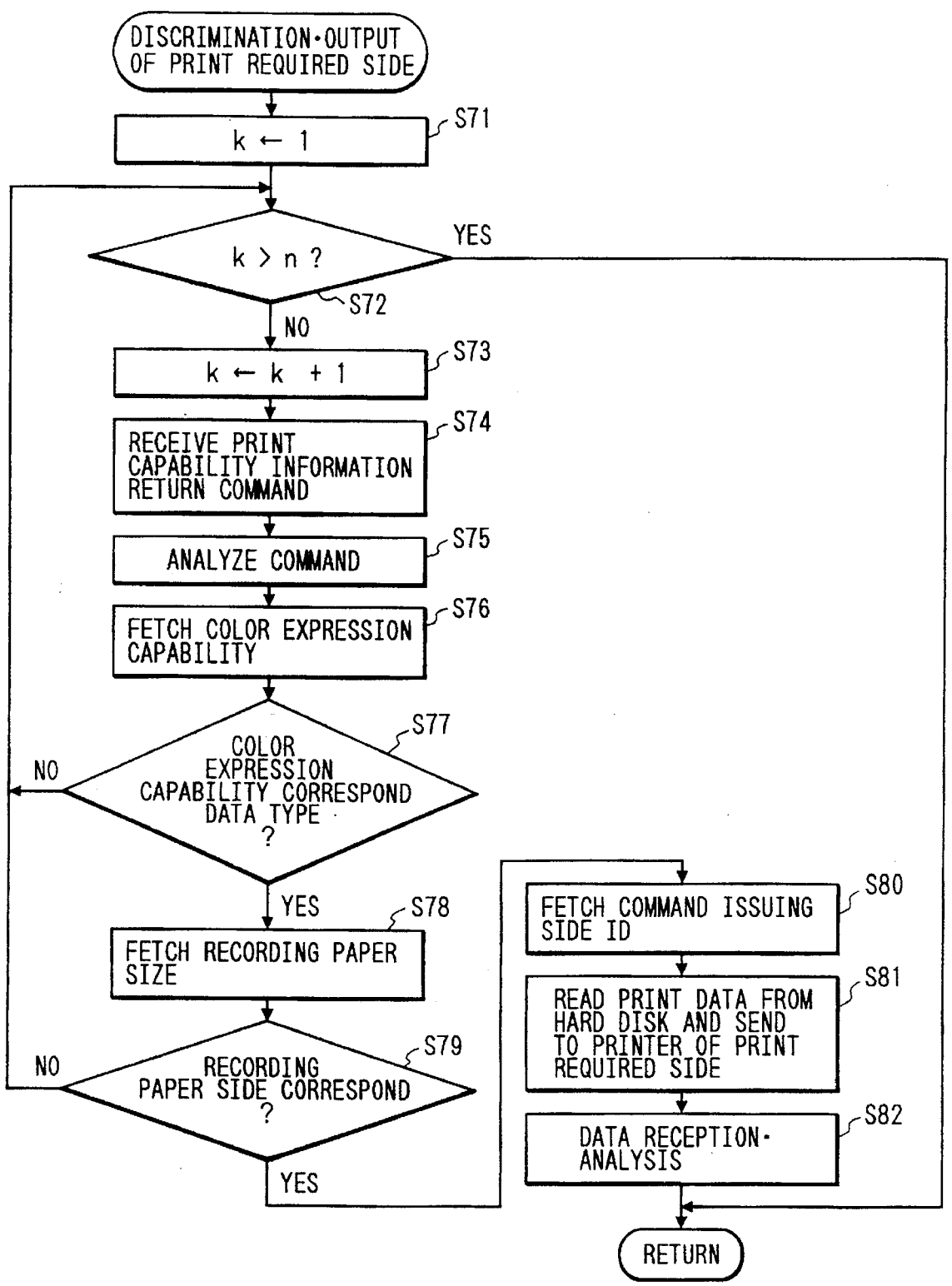
FIG. 16 is a flow chart showing an example of a print required side discrimination-output processing sequence shown in FIG. 13.

FIG. 16 is a flow chart showing an example of the print required side discrimination output processing sequence.

Referring to FIG. 16, the printer a 20 substitutes "1" in the loop counter k in step S71. If it is determined in step S72 that k>n, the flow returns to the parent routine shown in FIG. 13; if it is determined in step S72 that k≦n, the flow advances to step S73.

When k≦n, the printer a 20 increments the contents of the loop counter k in step S73, receives the print capability information return command issued by a given printer in step S74, analyzes the command in step S75, fetches color expression capability data from the command in step S76, and compares the fetched color expression capability data with the data type stored in the print data attribute storage unit 2a in step S77. If the two data coincide with each other, the flow advances to step S78; otherwise, the flow returns to step S72.

If the color expression capability data coincides with the data type, the printer a 20 fetches recording paper size data from the print capability information return command in step S78, and compares the fetched recording paper size data with the recording paper size data stored in the print data attribute storage unit 2a in step S79. If the two data coincide with each other, the flow advances to step S80; otherwise, the flow returns to step S72.

When the two recording paper size data coincide with each other, the printer a 20 fetches the command issuing side ID from the print capability information return command in step S80, and transfers the print data read out from the hard disk 26 to the printer indicated by the fetched ID character string in step S81. Thereafter, the flow returns to the parent routine shown in FIG. 13.

The printer to which the print data is transferred from the printer a 20 performs printing based on the print data.

More specifically, the printer a 20 stores the received print data in the hard disk 26, and discriminates the attributes (e.g., monochrome/color, recording paper size, and the like) of the print data. If the print data can be printed by the printer a 20 itself, the printer a 20 executes a print operation. However, if the print data cannot be printed by the printer a 20, the printer a 20 checks the print capabilities of the printers on the network, transfers the print data stored in the hard disk 26 to a printer which can print the print data of the attributes, and causes the printer to execute the print operation.

As described above, according to this embodiment, a user of the host computer can obtain a desired print result from any one of the printers on the network by supplying print data to a specific printer (the printer a 20 in the above description). More specifically, the user need not select a printer which can perform a desired print operation from those on the network in correspondence with the attributes (e.g., monochrome/color, recording paper size, and the like) of print data.

Note that in the above description and FIG. 2, the received print data, print command, and the like are stored in the hard disk. However, this embodiment is not limited to this. For example, an MOD (magnetooptical disk device) may be used. Since a magnetooptical disk freely allows a rewrite operation of data like in the hard disk, the hard disk 26 shown in FIG. 2 need only be replaced by the MOD.

FIG. 17 shows the operation principle of the magnetooptical disk. When a magnetic generator applies a magnetic field in a direction opposite to the direction of an initial magnetic field of a recording layer of a disk, and strong laser light is radiated onto the disk, the direction of the magnetic field of the portion, irradiated with the laser light, of the disk aligns in the direction of the applied magnetic field. After the radiation of the laser light is stopped, the direction of the magnetic field of the portion, where the direction of the magnetic field is reversed, remains the same.

Note that the present invention can be applied to either a system constituted by a plurality of devices or an apparatus constituted by a single device.

The present invention can also be applied to a case wherein the invention is achieved by supplying a program to the system or apparatus, as a matter of course.

The printers of the present invention may comprise either electrophotography printers or ink-jet printers for ejecting an ink by energy. That is, the present invention is not limited to specific types of printers.

As described above, this embodiment can provide an image forming apparatus, an image forming system, and an image forming method therefor, wherein a first image forming apparatus, which received image information via a computer network, checks if image formation of the received image information is possible, and if the image formation is possible, the first image forming apparatus performs the image formation based on the received image information; if the image formation is impossible, the first image forming apparatuses searches for a second image forming apparatus which can perform image formation by executing bidirectional communications via the computer network, and transfers the received image information to the second image forming apparatus. Therefore, one of printers connected to the network can be automatically selected in accordance with the attributes of print data without requiring a user to operate the host computer.

What is claimed is:

1. An image forming apparatus connected to a network which connects a plurality of image forming apparatuses, said image forming apparatus comprising:

reception means for receiving image information to be subjected to image formation;

image forming means for forming an image on the basis of the image information;

determination means for determining whether or not said image forming means can perform image formation of the image information received by said reception means; and transfer means for searching by bidirectional communication via the network for a second image forming apparatus which can perform image formation of the received image information in accordance with a determination result of said determination means, and transferring the image information via the network to the second image forming apparatus, wherein said determination means comprises:

a capability generation unit for generating image formation capability information of said image forming means; and an attribute generation unit for generating data attribute information of the image information by analyzing the image information, wherein said determination means determines, based on the image formation capability information and the data attribute information, whether or not image formation of the image information is possible, and wherein said transfer means comprises:

a storage unit for pre-storing identification information to be used for identifying the second image forming apparatus on the network;

an acquisition unit for acquiring image information capability information of the second image forming apparatus via the network on the basis of the identification information stored in said storage unit;

a determination unit for determining, based on the image formation capability information acquired from the second image forming apparatus by said acquisition unit and the data attribute information generated by said attribute generation unit, whether or not the second image forming apparatus can perform image formation of the image information; and transfer means for transferring the image information to the second image forming apparatus in accordance with a determination result of said determination unit.

2. An apparatus according to claim 1, wherein said image formation capability information indicates whether or not color image formation is possible.

3. An image forming system comprising:

A) a first image forming apparatus which is connected to a network and includes:

reception means for receiving image information to be subjected to image information;

image forming means for forming an image corresponding to the image information received by said reception means;

obtaining means for obtaining an image formation capability of a second image forming apparatus connected to the network by bidirectional communication with the second image forming apparatus through the network; and transfer means for transferring the image information received by said reception means to the second image forming apparatus on the basis of the image formation capability obtained by said obtaining means; and B) a second image forming apparatus which is connected to the network and includes:

reception means for receiving image information to be subjected to image formation; and image forming means for forming an image corresponds to the image information received by said reception means, wherein said image forming means of said second image forming apparatus forms the image received from said first image forming apparatus.

4. A system according to claim 3, wherein said second image forming apparatus further includes:

means for transferring by bidirectional communication through the network an image formation capability of said second image forming apparatus to said first image forming apparatus.

5. A system according to claim 3, wherein said obtaining means comprises communication means for performing the bidirectional communication with said second image forming apparatus.

6. A system according to claim 5, wherein said transfer means transfers the image information received by said reception means to the second image forming apparatus in correspondence with a determination result of said determination means.

7. A system according to claim 3, further comprising:

determination means for determining whether or not the image information received by said reception means can be subjected to image formation by said image forming means.

8. A system according to claim 7, wherein said transfer means transfers the image information received by said reception means to the other image forming apparatus in correspondence with a determination result of said determination means.

9. A system according to claim 3, wherein said image forming capability indicates whether or not color image formation is possible.

10. An image forming apparatus which is connected to a network and is used with a separate apparatus which is connected to the network and includes:

reception means for receiving image information to be subjected to image information;

image forming means for forming an image corresponding to the image information received by the reception means;

obtaining means for obtaining an image formation capability of said image forming apparatus connected to the network by bidirectional communication with said image forming apparatus through the network; and transfer means for transferring the image information received by said reception means to said image forming apparatus on the basis of the image formation capability obtained by said obtaining means, said image forming apparatus comprising:

reception means for receiving image information to be subjected to image formation; and image forming means for forming an image corresponds to the image information received by said reception means, wherein said image forming means of said image forming apparatus forms the image received from the separate apparatus.

11. An image forming apparatus according to claim 10, wherein said image forming apparatus further includes:

means for transferring by bidirectional communication through the network an image formation capability of said image forming apparatus to the separate apparatus.

12. An image forming apparatus according to claim 10, wherein the obtaining means comprises communication means for performing the bidirectional communication with said image forming apparatus.

13. An image forming apparatus according to claim 12, wherein the transfer means transfers the image information received by the reception means to said image forming apparatus in correspondence with a determination result of the determination means.

14. A system according to claim 10, further comprising:

determination means for determining whether or not the image information received by said reception means can be subjected to image formation by said image forming means.

15. A system according to claim 14, wherein said transfer means transfers the image information received by said reception means to said other image forming apparatus in correspondence with a determination result of said determination means.

16. A system according to claim 10, wherein said image forming capability indicates whether or not color image formation is possible.

17. An image forming apparatus which is connected to a network and via the network to a second image forming apparatus which includes:

reception means for receiving image information to be subjected to image formation; and image forming means for forming an image corresponds to the image information received by the reception means, wherein the image forming means of the second image forming apparatus forms an image received from said image forming apparatus;

said image forming apparatus comprising:

reception means for receiving image information to be subjected to image information;

image forming means for forming an image corresponding to the image information received by said reception means;

obtaining means for obtaining an image formation capability of the second image forming apparatus connected to the network by bidirectional communication with the second image forming apparatus through the network; and transfer means for transferring the image information received by said reception means to the second image forming apparatus on the basis of the image formation capability obtained by said obtaining means.

18. An image forming apparatus according to claim 17, wherein the second image forming apparatus further includes:

means for transferring by bidirectional communication through the network an image formation capability of the second image forming apparatus to said image forming apparatus.

19. An image forming apparatus according to claim 17, wherein said obtaining means comprises communication means for performing the bidirectional communication with the second image forming apparatus.

20. An image forming apparatus according to claim 19, wherein said transfer means transfers the image information received by said reception means to the second image forming apparatus in correspondence with a determination result of said determination means.

* * * * *

UNITED STATES PATENT AND TRADEMARK OFFICE
CERTIFICATE OF CORRECTION

PATENT NO. : 5,630,062

DATED : May 13, 1997

INVENTOR(S) : TOSHIHISA OKUTSU

It is certified that error appears in the above-identified patent and that said Letters Patent is hereby corrected as shown below:

COLUMN 5

Line 35, "5" should be deleted.

COLUMN 6

Line 65, "5" should be deleted.

COLUMN 12

Line 10, "corresponds" should read --corresponding--.

Signed and Sealed this

Twenty-third Day of December, 1997

Attest:

BRUCE LEHMAN

Attesting Officer

Commissioner of Patents and Trademarks